United States Patent
van Klooster et al.

(10) Patent No.: US 7,810,399 B2
(45) Date of Patent: Oct. 12, 2010

(54) ULTRASONIC FLOWMETER

(75) Inventors: Jeroen Martin van Klooster, Tiel (NL);
Cornelis Johannes Hogendoorn, Spijk (NL)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 11/958,513

(22) Filed: Dec. 18, 2007

(65) Prior Publication Data
US 2008/0141786 A1    Jun. 19, 2008

(30) Foreign Application Priority Data

Dec. 19, 2006  (DE)  .................. 10 2006 060 453
Jan. 26, 2007  (DE)  .................. 10 2007 004 936

(51) Int. Cl.
*G01F 1/66* (2006.01)

(52) U.S. Cl. .............. 73/861.31; 73/861.27; 73/861.28; 73/861.29

(58) Field of Classification Search . 73/861.41–861.45, 73/61.79, 861.27–861.2, 861.31, 861.319
See application file for complete search history.

(56) References Cited

U.S. PATENT DOCUMENTS

| | | | | |
|---|---|---|---|---|
| 3,564,912 | A * | 2/1971 | Malone et al. | 73/861.31 |
| 3,940,985 | A * | 3/1976 | Wyler | 73/861.31 |
| 4,078,428 | A * | 3/1978 | Baker et al. | 73/861.31 |
| 4,103,551 | A * | 8/1978 | Lynnworth | 73/861.31 |
| 4,248,085 | A * | 2/1981 | Coulthard | 73/861.23 |
| 5,515,733 | A * | 5/1996 | Lynnworth | 73/861.27 |
| 5,531,124 | A * | 7/1996 | Kim et al. | 73/861.27 |
| 5,546,812 | A * | 8/1996 | Drenthen | 73/861.29 |
| 6,089,104 | A * | 7/2000 | Chang | 73/861.27 |
| 6,209,388 | B1 * | 4/2001 | Letton et al. | 73/61.79 |
| 6,386,018 | B1 * | 5/2002 | Letton et al. | 73/61.79 |

(Continued)

FOREIGN PATENT DOCUMENTS

| | | |
|---|---|---|
| DE | 19503714 | 8/1996 |
| WO | WO98/19296 | 5/1998 |

OTHER PUBLICATIONS

Lynnworth et al. "Ultrasonic Flowmeters: Half-Century Progress Report, 1955-2005". Ultrasonics 44 (2006) pp. 1371-1378 <Available Online> Jun. 5, 2006.*

*Primary Examiner*—Lisa M Caputo
*Assistant Examiner*—Jonathan Dunlap
(74) *Attorney, Agent, or Firm*—Cesari and McKenna, LLP (57) ABSTRACT

An ultrasonic flowmeter with a measuring tube through which flows a medium and which, viewed in cross section, has a split circumference forming two halves with two ultrasonic converter pairs, each with an associated ultrasound reflector. The converters of each pair are mounted on a common circumferential half in a mutually offset position as viewed in the longitudinal direction of the tube, while the reflector for each pair is positioned on the other, opposite circumferential half in the longitudinal direction of the measuring tube between the two converters, so that an ultrasound signal emitted by one converter of a pair travels along a V-shaped signal path via the reflector of the associated pair to the other converter of that pair. The first pair and the second reflector are positioned on one circumferential half of the tube while the second pair and the first reflector are positioned on the other, opposite circumferential half of the tube.

11 Claims, 6 Drawing Sheets

U.S. PATENT DOCUMENTS

| | | | |
|---|---|---|---|
| 6,474,174 B2 * | 11/2002 | Su | 73/861.31 |
| 6,550,345 B1 * | 4/2003 | Letton | 73/861.27 |
| 6,732,595 B2 * | 5/2004 | Lynnworth | 73/861.27 |
| 6,769,293 B2 * | 8/2004 | Zanker | 73/61.79 |
| 7,159,472 B1 * | 1/2007 | Hastings et al. | 73/861.27 |
| 2004/0011141 A1 * | 1/2004 | Lynnworth | 73/861.27 |
| 2007/0079660 A1 * | 4/2007 | Feller | 73/861.27 |
| 2008/0156107 A1 * | 7/2008 | Ao et al. | 73/861.27 |

* cited by examiner

ULTRASONIC FLOWMETER

BACKGROUND OF THE INVENTION

1. Field of the Invention

This invention relates to an ultrasonic flowmeter with a measuring tube through which flows a medium and which, viewed in its cross section, has a bipartite split circumference forming two halves, and with two pairs of ultrasonic converters, each with an associated ultrasound reflector, which ultrasonic converters of each ultrasonic converter pair are mounted on a common circumferential half in a mutually offset position as viewed in the longitudinal direction of the measuring tube, while the ultrasound reflector for each pair of ultrasonic converters is positioned on the other, opposite circumferential half of the measuring tube between the two ultrasonic converters, in such fashion that an ultrasound signal emitted by one ultrasonic converter of an ultrasonic converter pair travels along a V-shaped signal path via the ultrasound reflector of the associated ultrasonic converter pair to the other ultrasonic converter of that ultrasonic converter pair.

The measuring accuracy of ultrasonic flowmeters generally tends to deteriorate when the medium passing through the measuring tube flows unevenly, thus deviating from a fully developed laminar or turbulent flow pattern. Such irregularities may be due to changing pipe diameters or bends along the flow path of the medium. These irregularities are generally differentiated among three categories, to wit: axial disturbances, tangential disturbances such as vortices, and radial disturbances. Tangential and radial disturbances do not contribute to a change in the actual volume flow rate. They do, however, affect ultrasonic measurements, as will be explained below.

An ultrasonic flowmeter typically encompasses at least two ultrasonic converters, together constituting an ultrasonic converter pair and mounted in a mutually offset position in the direction of the flow. One of the ultrasonic converters emits an ultrasound signal that passes through the flowing medium and is received by the other ultrasonic converter. The system design usually provides for the other ultrasonic converter to be able on its part to transmit an ultrasound signal that is received by the first ultrasonic converter. In this fashion, ultrasound signals alternately pass through the flowing medium in or against the direction of flow. The entrainment effect of the flowing medium results in different runtimes in and, respectively, against, the flow direction. Where the length and the angle of the acoustic path relative to the flow direction are known, the runtimes in and against the flow direction permit a determination of the flow rate of the medium.

If a pipeline includes, for instance, an upward or downward bend followed by a bend to the right or left, the flow pattern can be expected to be subject to axial as well as tangential irregularities. Moreover, the tangential disturbance is likely to add another speed component along the acoustic measuring path, thus falsifying the runtimes on the basis of which the overall flow rate is determined.

2. The Prior Art

To date, the approach for a solution to this problem has been to employ a minimum of two mutually intersecting measuring paths in one common plane. If the angles of the two measuring paths in the direction of flow are identical, the undesirable tangential and radial speed components can be eliminated by averaging the flow rates determined along those two paths.

One drawback lies in the fact that at least twice as many ultrasonic converters are needed. Accommodating additional ultrasonic converters in the measuring tube usually requires additional converter pockets in the wall of the measuring tube which, in turn, adds further flow disturbances.

Another approach to solving the above-described problem has been to use V-shaped signal paths. The method employed provides for the two ultrasonic converters of an ultrasonic converter pair to be mounted on one common side of the measuring tube, with an ultrasound reflector positioned on the opposite side of the measuring tube. Depending on the curvature of the measuring tube in the respective plane, such an ultrasound reflector may, in fact, be constituted of the inner wall of the measuring tube itself, or a separate ultrasound reflector may be installed for instance in the form of a flat plate. This is part of the prior art and also applies to the invention described further below.

In this case, an ultrasonic signal emitted by an ultrasound converter travels along a V-shaped signal path via the ultrasound reflector to the other ultrasound converter of the ultrasonic converter pair. Similarly, an ultrasonic signal can be transmitted in the opposite direction. As stated above, this makes for a configuration that permits the elimination of the tangential and radial components through an averaging process. As one major advantage of this solution, no additional ultrasound converters are needed.

US 200410011141 describes an ultrasonic flowmeter of the type described above. That device uses multiple V-shaped signal paths extending along mutually parallel planes. The ultrasound converter pairs and, respectively, the ultrasound reflectors are mounted on different sides of the measuring tube in the ultrasonic flowmeter. One advantage of that design is that at least the uppermost and the bottom-most V-shaped signal paths can be positioned at only a small maximum distance from the inner wall of the measuring tube. It has, in fact, been found that a minimal distance from the inner wall of the measuring tube is conducive to improved measuring accuracy since this type of signal path permits highly precise detection, and thus elimination, especially of axial irregularities. Moreover, jointly positioning all of the ultrasound converters on one single side of the measuring tube facilitates maintenance, especially when the measuring tube is accessible only with great difficulty and perhaps only from one side.

Using multiple V-shaped signal paths in mutually parallel planes, as described above, has proved to be substantially more effective in eliminating radial and tangential flow disturbances than is attainable with the conventional signal-path configurations referred to above. However, tests have revealed that there is still an error rate of about 0.15%.

SUMMARY OF THE INVENTION

It is, therefore, the objective of this invention to introduce an ultrasonic flowmeter which permits a nearly complete elimination of the tangential and radial disturbances in the measurement of the flow rate.

For an ultrasonic flowmeter as first described above, this objective is achieved by positioning the first ultrasound converter pair and the second ultrasound re-on one circumferential half of the measuring tube and the second ultrasound converter pair and the first ultrasound reflector on the other circumferential half.

In other words, according to the invention, the ultrasound converter pairs are mounted on mutually opposite sides and the ultrasonic signals of one ultrasound converter pair are emitted from one side and the ultrasonic signals of the other ultrasound converter pair are emitted from the other side into the flowing medium. This novel configuration is based on the realization that the error remaining in the elimination of the tangential and radial disturbances essentially derives from the fact that in the axial direction, these disturbances are not constant. The proposed configuration of the signal paths, however, can to an essentially total extent eliminate that residual error, as will be explained further below.

It should be pointed out at this juncture that positioning an ultrasound converter and, respectively, an ultrasound reflector "on" a circumferential half of such a system refers to any arrangement that permits the transmission, reception and, respectively, the reflection of ultrasonic signals in the area of the inner wall of the measuring tube.

Also, the term "V-shaped signal path" refers to any form of signal paths obtainable by mutually offsetting the ultrasound converters of the ultrasound converter pair in the flow direction and, viewed in the flow direction, by positioning the ultrasound reflector at a point between them. In particular, a "V-shaped" signal path does not require a specific angle between the legs of the "V" or an identical length of the legs.

In principle, it is possible for the two V-shaped signal paths to extend along the same plane. In a preferred embodiment of the invention, however, the two V-shaped signal paths extend along different planes. As another preferred feature, the two different planes do not intersect within the measuring tube. Most desirably, the different planes extend parallel to each another.

The advantages offered by the invention as stated above are already achieved with only two ultrasound converter pairs. A preferred embodiment of the invention, however, includes at least one additional pair of ultrasound converters with an associated ultrasound reflector for creating an additional V-shaped signal path. Especially preferred is a configuration comprising multiple additional ultrasound converter pairs, permitting the creation of one each V-shaped signal path in several mutually different and preferably parallel planes, in which case the ultrasound converters for neighboring signal paths are positioned on different circumferential halves of the measuring tube. Viewed in the radial direction of the measuring tube, the result is an array of V-shaped signal paths whose open ends and vertices alternately appear on one or the other of the two circumferential halves.

In one preferred embodiment of the invention, two ultrasound reflectors, viewed in the longitudinal direction of the measuring tube, are spaced apart by not more than the maximum distance between the two ultrasound converters of an ultrasound converter pair. Most desirably, all ultrasound reflectors, viewed in the longitudinal direction of the measuring tube, are arranged over the same length of the measuring tube.

Apart from the objective of the invention specified above, it would often be necessary to equip the ultrasonic flowmeter with a diagnostic function capable of indicating whether a proper measuring operation is being maintained.

For the ultrasonic flowmeter first described above, this is accomplished by providing a third ultrasound converter pair with a corresponding ultrasound reflector for creating a V-shaped signal path that extends along a plane which intersects the other two planes within the measuring tube.

Thus, according to the invention, a third signal path extends at an angle other than zero degrees relative to the other two planes in a manner whereby it intersects the other two signal-path planes within the flowing medium. This permits a diagnostic function by means of which it is possible, for example, to determine whether dirt has accumulated on the bottom of the measuring tube.

As a result of any such dirt accumulation, a point of reflection in that area would shift toward the center of the measuring tube, reducing the length of the acoustic path. It follows that, if in the course of the measuring operation, a diminishing runtime of that third signal path intersecting the other two planes is detected, it may be an indication of an undesirable dirt accumulation. In addition, providing a third V-shaped signal path as described, intersecting the other two planes within the measuring tube, permits the additional capture of a flow value and thus further enhances the accuracy of the flow measurements.

Specifically, in a preferred configuration according to the invention, the other two planes do not intersect within the measuring tube. Most desirably, the other two planes extend parallel to each other while the third plane extends in a direction perpendicular to these other two planes. In a preferred embodiment of the invention, the longitudinal axis of the measuring tube extends within that third plane.

In another preferred implementation of the invention, it is equally possible, however, to provide a fourth ultrasound converter pair with an associated ultrasound reflector for creating a V-shaped signal path which signal path extends along a plane that intersects the other two planes within the measuring tube, in which case the third plane and the fourth plane each extend at an angle other than 90° relative to the first plane and the second plane, but not parallel to each other. In this fashion the aforementioned diagnostic function may be expanded to monitor, for instance, several points of reflection.

Other preferred design variations are obtainable, analogous to the configurational possibilities described above in connection with the first inventive solution, especially in terms of the inclusion of additional ultrasound converter pairs specifically for creating V-shaped signal paths in varying but, preferably, mutually parallel planes.

Finally, this invention relates to an ultrasonic flowmeter with a measuring tube through which flows a medium and which, viewed in its cross section, has a bipartite split circumference forming two halves, and comprising at least one pair of ultrasonic converters with an associated ultrasound reflector, which ultrasonic converters of each ultrasonic-converter pair are mounted on a common circumferential half in a mutually offset position as viewed in the longitudinal direction of the measuring tube, while the ultrasound reflector for each pair of ultrasonic converters is positioned on the other, opposite circumferential half of the measuring tube between the two ultrasonic converters, in such fashion that an ultrasound signal emitted by one ultrasonic converter of an ultrasonic converter pair travels along a V-shaped signal path via the ultrasound reflector of the associated ultrasonic converter pair to the other ultrasonic converter of that ultrasonic converter pair.

As has been mentioned, the ultrasound converters are usually accommodated in converter pockets that may be provided in the wall of the measuring tube. This poses a problem when measuring the flow of gas with a liquid component which can deposit itself in the converter pockets, potentially leading to undesirable situations. If, for example, a drop of water is deposited in a converter pocket, that drop could form a bridge between the ultrasound converter and the measuring tube, causing an undesirable acoustic coupling between the converter, otherwise largely sound-insulated from the measuring tube, and that tube.

It is therefore another objective of this invention to introduce an ultrasonic flowmeter designed to avoid the above-mentioned problem.

For the ultrasonic flowmeter described above, this objective is achieved by orienting the measuring tube in a way whereby the ultrasound converter of the ultrasound converter pair is positioned in a location higher than that of the associated ultrasound reflector.

This, according to the invention, ensures that the converter pockets provided for the ultrasound converter can point toward the interior of the measuring tube, making them self-draining for liquid and pasty substances. This design approach can be universally combined with all of the configurations described above.

A preferred embodiment of the invention comprises at least one additional ultrasound converter pair with a corresponding ultrasound reflector for creating another V-shaped signal path that extends along a plane which does not intersect the plane of the first V-shaped signal path within the measuring tube, in this case positioning the ultrasound converters of the additional ultrasound converter pair at a level higher than that of the associated ultrasound reflector. Most desirably, the planes extend parallel to one another while the ultrasound converter pairs are mounted on one circumferential half and the ultrasound reflectors are mounted on the other circumferential half of the measuring tube. As a result, the converter pockets for the ultrasound converters will self-drain as described above even in the case of multiple V-shaped signal paths.

The following will explain this invention in more detail with reference to the attached drawings.

BRIEF DESCRIPTION OF THE DRAWINGS

In the drawings:

FIGS. 1 *a* and *b*: schematically illustrate the concept of an ultrasonic flowmeter according to a first embodiment of the invention;

FIGS. 2 *a* and *b*: schematically show, in a top view, the pattern of the signal paths in the ultrasonic flowmeter according to the first preferred embodiment of the invention (FIG. 2*b*) as compared to the prior art (FIG. 2*a*);

FIGS. 3 *a* and *b*: schematically illustrate an ultrasonic flowmeter according to a second preferred embodiment of the invention;

FIGS. 4 *a* and *b*: schematically illustrate an ultrasonic flowmeter according to a third preferred embodiment and a fourth preferred embodiment of the invention;

FIG. 5 *a* and *b*: schematically illustrates an ultrasonic flowmeter according to a fifth preferred embodiment of the invention, and FIG. 6 *a* and *b*: schematically illustrates an ultrasonic flowmeter according to a sixth preferred embodiment of the invention.

Figure 1A:
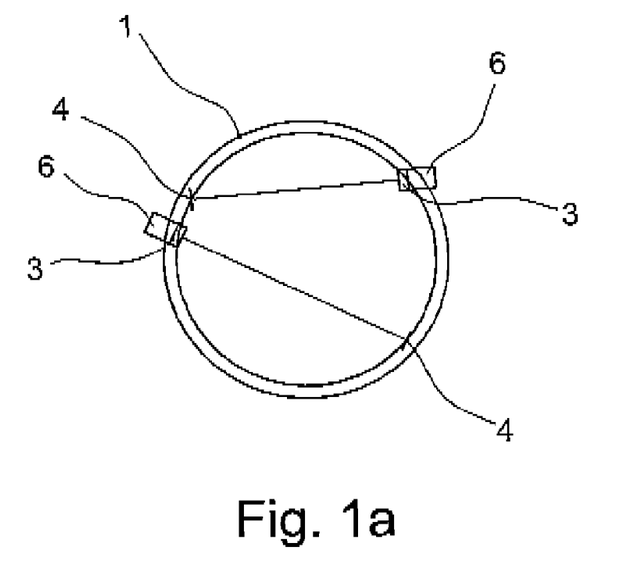
Figure 1B:
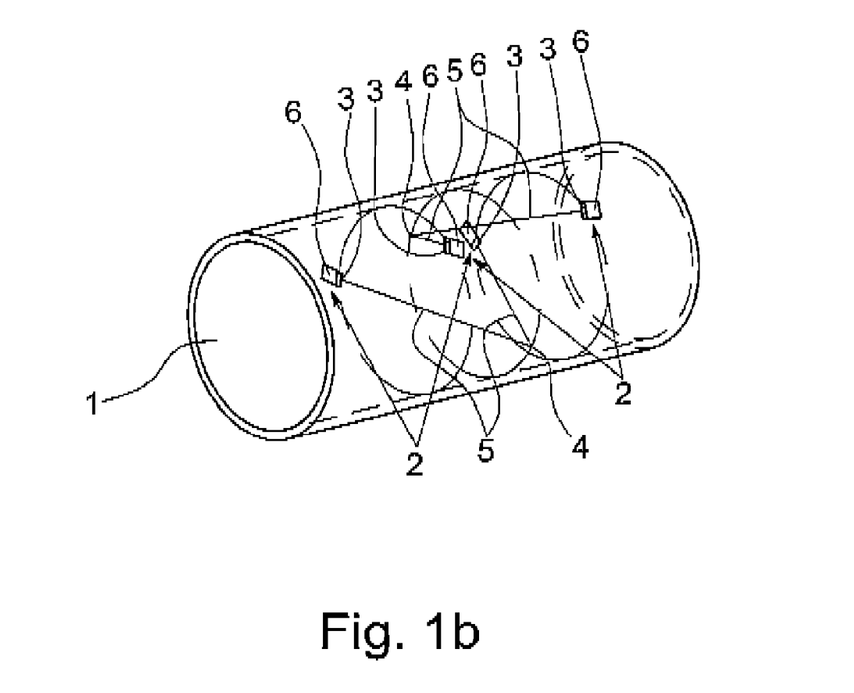

FIGS. 1*a* and 1*b* represent a schematic cross sectional and, respectively, perspective view of an ultrasonic flowmeter according to a first preferred embodiment of the invention. They only show the important invention related components, these being a measuring tube 1 for a flowing medium, not depicted, and multiple ultrasound converter pairs 2, each with an ultrasound converter 3 and, associated with each ultrasound converter pair, an ultrasound reflector 4. The ultrasound converter pairs are alternately positioned on one or the other circumferential half of the measuring tube 1, in a manner as to create parallel planes, each with a V shaped signal path 5. The alternating placement one side and, respectively, on the opposite side of the measuring tube 1 results in a pattern whereby the V shaped signal paths 5 alternately have their open ends on one or on the other side of the tube. It should be noted that for the central signal path 5, the inner separate ultrasound reflector. FIGS. 1*a* and 1*b* represent, respectively, a schematic cross-sectional and a perspective view of an ultrasonic flowmeter according to a first preferred embodiment of the invention. The ultrasonic flowmeter has a measuring tube 1 through which flows a medium, not shown, and which, when viewed in cross section, has a bipartite split circumference forming two halves, and with two ultrasonic converter pairs 2, each with an associated ultrasound reflector 4, the ultrasonic converters 3 of each ultrasonic-converter pair 2 being mounted on a common circumferential half in a mutually offset position as viewed in the longitudinal direction of the measuring tube 1, while the ultrasound reflector 4 for each ultrasonic converter pair 2 is positioned on the other, opposite, circumferential half in the longitudinal direction of the measuring tube 1 between the two ultrasonic converters 3, in such fashion that an ultrasound signal emitted by one ultrasonic converter 3 of an ultrasonic converter pair 2 travels along a V-shaped signal path 5 via the ultrasound reflector 4 of the associated ultrasonic converter pair 2 to the other ultrasonic converter 3 of that ultrasonic converter pair 2, wherein the first ultrasound converter pair 2 and the second ultrasound reflector 4 are positioned on one circumferential half of the measuring tube 1 while the second ultrasound converter pair 2 and the first ultrasound reflector 4 are positioned on the other circumferential half of the measuring tube 1, wherein the two V-shaped signal paths 5 extend along different planes, which different planes do not intersect within the measuring tube 1 and wherein the measuring tube 1 is oriented in a way whereby the ultrasound converters 3 of all ultrasound converter pairs 2 are positioned at a level higher than that of the associated ultrasound reflector 4. The converter pockets 6 accommodating the ultrasound converters 3 point downward. As has been explained above, this ensures a self-draining function of the converter pockets 6 for liquid and pasty substances.

Figure 2A:
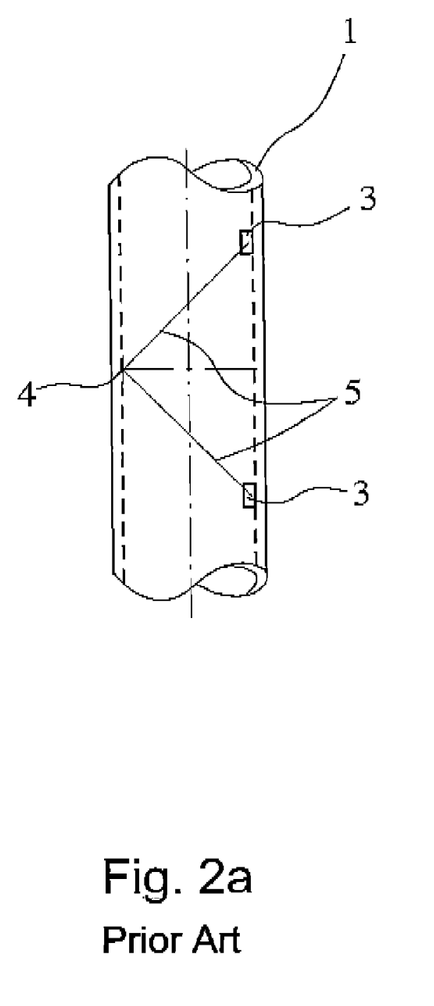
Figure 2B:
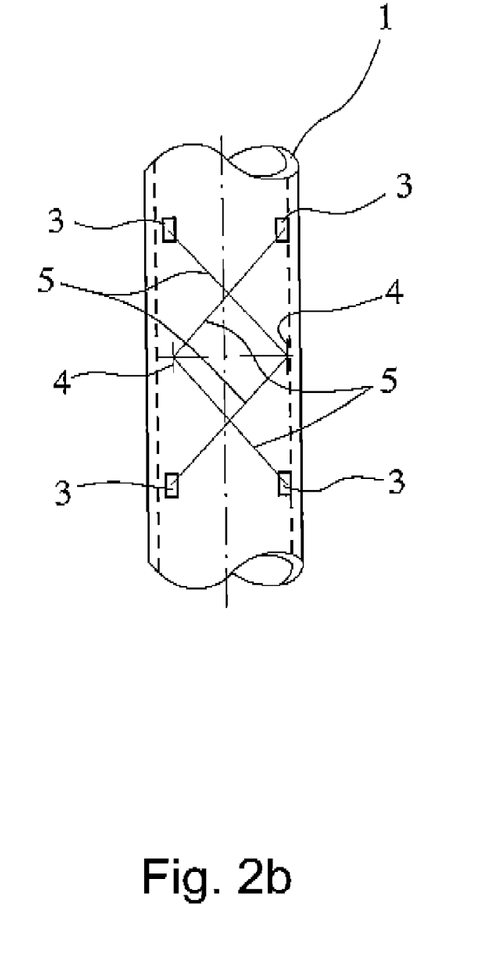

The top view of FIG. 2*a* represents a prior-art concept with a single V-shaped signal path 5, or several V-shaped signal paths 5, all opening to the right, however. By contrast, FIG. 2*b* schematically illustrates an arrangement of signal paths 5 according to the first preferred embodiment of the invention shown in FIGS. 1*a* and 1*b*, whereby one signal path 5 opens to the right and one signal path 5 opens to the left. Viewed in the longitudinal direction of the measuring tube 1, two ultrasound reflectors 3 are spaced apart by not more than the maximum distance between two ultrasound converters 3 of an ultrasound converter pair. Viewed in the longitudinal direction of the measuring tube 1, all ultrasound reflectors 3 are mounted over the same length of the measuring tube 1.

Figure 3A:
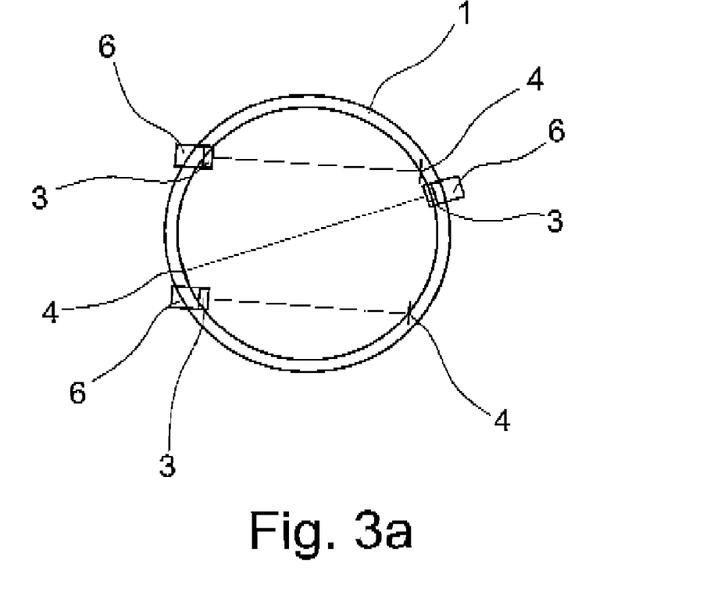
Figure 3B:
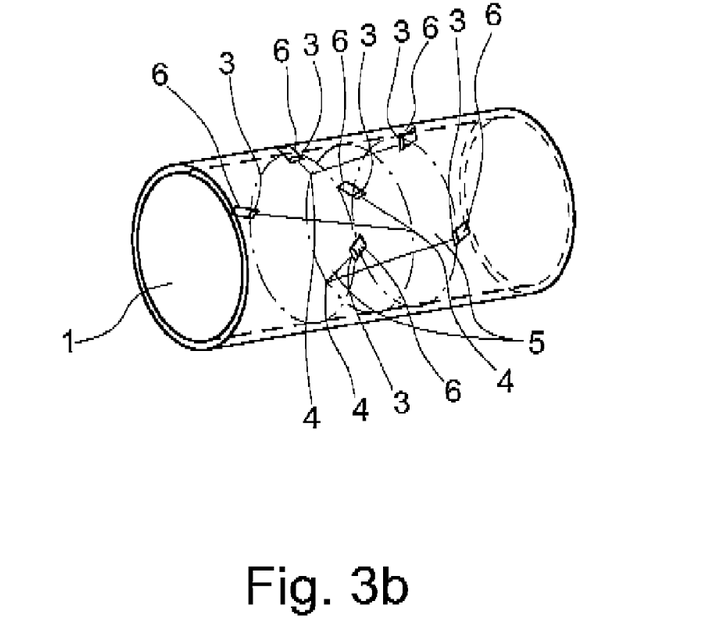

FIGS. 3*a* and 3*b* represent, respectively, a schematic cross-sectional and a perspective view of an ultrasonic flowmeter according to a second preferred embodiment of the invention. The ultrasonic flowmeter has a measuring tube 1 through which flows a medium, not depicted, and which, when viewed in its cross section, has a bipartite split circumference forming two halves, and with two ultrasonic converter pairs, each with an associated ultrasound reflector 4, the ultrasonic converters 3 of each ultrasonic-converter pair being mounted on a common circumferential half in a mutually offset position as viewed in the longitudinal direction of the measuring tube 1, while the ultrasound reflector 4 for each ultrasonic converter pair is positioned on the other, opposite, circumferential half in the longitudinal direction of the measuring tube 1 between the two ultrasonic converters 3, in such fashion that an ultrasound signal emitted by one ultrasonic converter 3 of an ultrasonic converter pair travels along a V-shaped signal path via the ultrasound reflector 4 of the associated ultrasonic converter pair to the other ultrasonic converter 3 of that ultrasonic converter pair, wherein the first ultrasound converter pair and the second ultrasound reflector 4 are positioned on one circumferential half of the measuring tube 1 while the second ultrasound converter pair and the first ultrasound reflector 4 are positioned on the other circumferential half of the measuring tube 1, wherein the two V-shaped signal paths extend along different planes, which different planes do not intersect within the measuring tube 1 and wherein the measuring tube 1 is oriented in a way whereby the ultrasound converters 3 of all ultrasound converter pairs are positioned at a level higher than that of the associated ultrasound reflector 4. The flowmeter comprises one additional ultrasound converter pair with an associated ultrasound reflector 4 for creating an additional V-shaped signal path 5. The converter pockets 6 accommodating the ultrasound converters 3 point downward.

As has been explained above, this ensures a self-draining function of the converter pockets 6 for liquid and pasty substances. It also permits a diagnostic function for the detection of dirt that may have accumulated on the bottom of the measuring tube 1. As has been explained above, any such dirt accumulation would shift the point of reflection, if provided in that location, toward the center of the measuring tube 1, thus shortening the acoustic path concerned. If over a period of time, the runtime of the signal path intersecting the other planes is found to be growing shorter, it may be an indication of undesirable dirt deposits. In addition, providing this V-shaped signal path that intersects the other planes within the measuring tube 1 permits the collection of one more flow value, thus further enhancing the accuracy of the flow measurement.

Figure 4A:
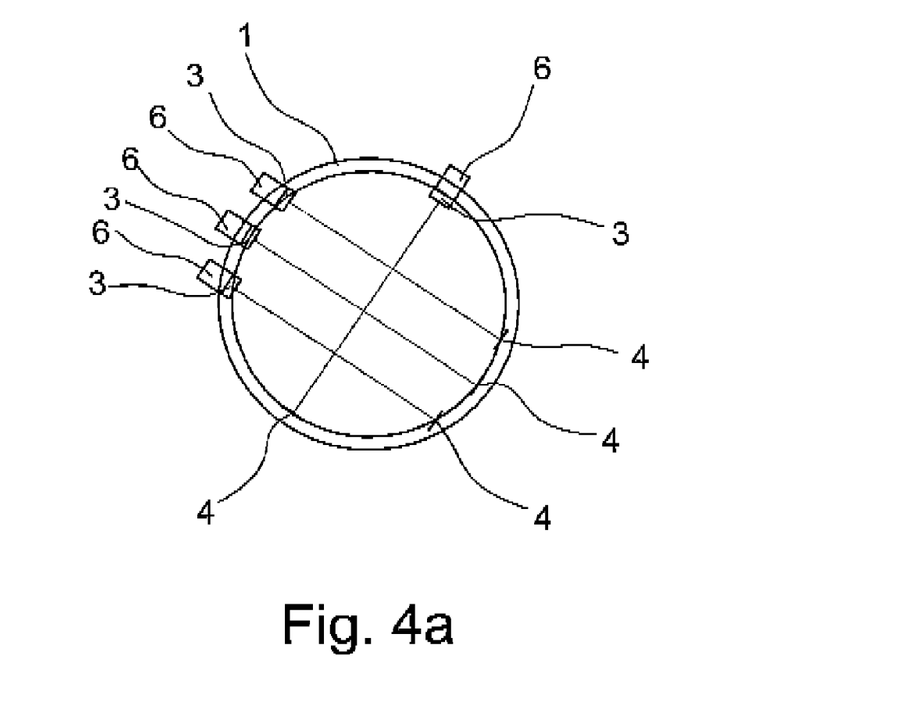
Figure 4B:
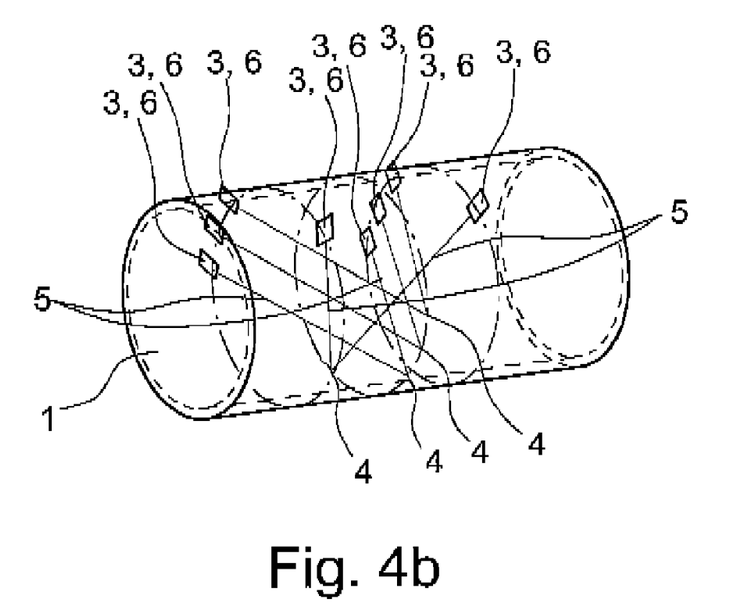

FIGS. 4a and 4b represent, respectively a schematic cross-sectional and a perspective view of an ultrasonic flowmeter according to a third preferred embodiment of the invention. The ultrasonic flowmeter has a measuring tube 1 through which flows a medium, not depicted, and which, when viewed in cross section, has a bipartite split circumference forming two halves, and with two ultrasonic converter pairs, each with an associated ultrasound reflector 4, which ultrasonic converters 3 of each ultrasonic converter pair are mounted on a common circumferential half in a mutually offset position as viewed in the longitudinal direction of the measuring tube 1, while the ultrasound reflector 4 for each ultrasonic converter pair is positioned on the other, opposite, circumferential half in the longitudinal direction of the measuring tube 1 between the two ultrasonic converters 3, in such fashion that an ultrasound signal emitted by one ultrasonic converter 3 of an ultrasonic converter pair travels along a V-shaped signal path via the ultrasound reflector 4 of the associated ultrasonic converter pair to the other ultrasonic converter 3 of that ultrasonic converter pair, wherein a third ultrasound converter pair is provided together with an associated ultrasound reflector 4 to create a V-shaped signal path 5 which extends along a plane that intersects the other two planes within the measuring tube 1, wherein the other two planes do not intersect within the measuring tube 1 and wherein the measuring tube 1 is oriented in a way whereby the ultrasound converters 3 of all ultrasound converter pairs are positioned at a level higher than that of the associated ultrasound reflector 4. The other two planes extend parallel to each other while the third plane extends in a direction perpendicular to the other two planes. The flowmeter incorporates one more ultrasound converter pair with an associated ultrasound reflector 4 for creating an additional V-shaped signal path 5 which signal path extends along a plane parallel to the first two mutually parallel planes. The converter pockets 6 accommodating the ultrasound converters 3 point downward. As has been explained above, this ensures a self-draining function of the converter pockets 6 for liquid and pasty substances.

FIGS. 4a and 4b also represent, respectively, a schematic cross-sectional and a perspective view of an ultrasonic flowmeter according to a fourth preferred embodiment of the invention. The ultrasonic flowmeter has a measuring tube 1 through which flows a medium, not depicted, and which, when viewed in cross section, has a bipartite split circumference forming two halves, and with two ultrasonic converter pairs, each with an associated ultrasound reflector 4, which ultrasonic converters 3 of each ultrasonic converter pair are mounted on a common circumferential half in a mutually offset position as viewed in the longitudinal direction of the measuring tube 1, while the ultrasound reflector 4 for each ultrasonic converter pair is positioned on the other, opposite, circumferential half in the longitudinal direction of the measuring tube 1 between the two ultrasonic converters 3, in such fashion that an ultrasound signal emitted by one ultrasonic converter 3 of an ultrasonic converter pair travels along a V-shaped signal path via the ultrasound reflector 4 of the associated ultrasonic converter pair to the other ultrasonic converter 3 of that ultrasonic converter pair, wherein a third ultrasound converter pair is provided together with an associated ultrasound reflector 4 to create a V-shaped signal path 5 which extends along a plane that intersects the other two planes within the measuring tube 1, wherein the other two planes do not intersect within the measuring tube 1 and wherein the measuring tube 1 is oriented in a way whereby the ultrasound converters 3 of all ultrasound converter pairs are positioned at a level higher than that of the associated ultrasound reflector 4. The flowmeter comprises one further ultrasound converter pair with an associated ultrasound reflector 4 for creating an additional V-shaped signal path 5 which extends along a plane that does not intersect the plane of the first V-shaped signal path within the measuring tube, and the ultrasound converters 3 of the additional ultrasound converter pair are positioned at a level higher than that of the associated ultrasound reflector 4. The planes extend parallel to one another and the ultrasound converter pairs are positioned on one circumferential half and the ultrasound reflectors 4 are positioned on the other circumferential half of the measuring tube 1. The converter pockets 6 accommodating the ultrasound converters 3 point downward. As has been explained above, this ensures a self-draining function of the converter pockets 6 for liquid and pasty substances.

Figure 5A:
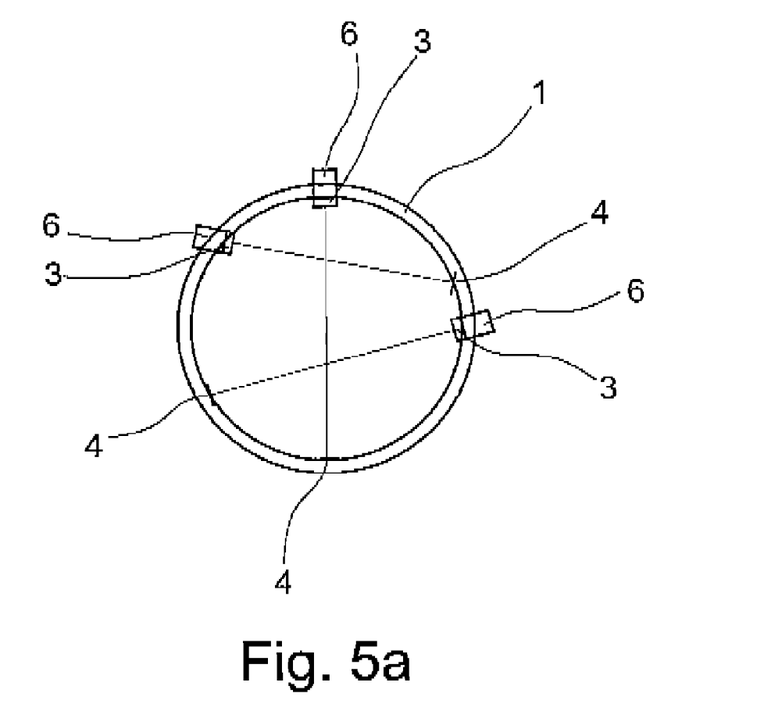
Figure 5B:
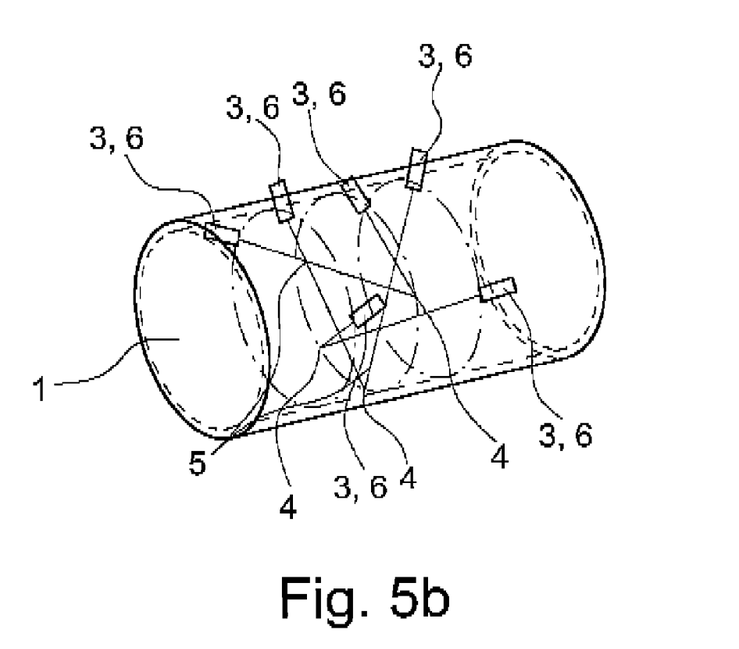

FIGS. 5a and 5b represent, respectively, a schematic cross-sectional and a perspective view of an ultrasonic flowmeter according to a fifth preferred embodiment of the invention. The ultrasonic flowmeter has a measuring tube 1 through which flows a medium, not depicted, and which, when viewed in cross section, has a bipartite split circumference forming two halves, and with two ultrasonic converter pairs, each with an associated ultrasound reflector 4, which ultrasonic converters 3 of each ultrasonic converter pair are mounted on a common circumferential half in a mutually offset position as viewed in the longitudinal direction of the measuring tube 1, while the ultrasound reflector 4 for each ultrasonic converter pair is positioned on the other, opposite, circumferential half in the longitudinal direction of the measuring tube 1 between the two ultrasonic converters 3, in such fashion that an ultrasound signal emitted by one ultrasonic converter 3 of an ultrasonic converter pair travels along a V-shaped signal path via the ultrasound reflector 4 of the associated ultrasonic converter pair to the other ultrasonic converter 3 of that ultrasonic converter pair, wherein a third ultrasound converter pair is provided together with an associated ultrasound reflector 4 to create a V-shaped signal path 5 which extends along a plane that intersects the other two planes within the measuring tube 1, wherein the other two planes do not intersect within the measuring tube 1 and wherein the measuring tube 1 is oriented in a way whereby the ultrasound converters 3 of all ultrasound converter pairs are positioned at a level higher than that of the associated ultrasound reflector 4. The third plane encompasses the longitudinal axis of the measuring tube 1.

Figure 6A:
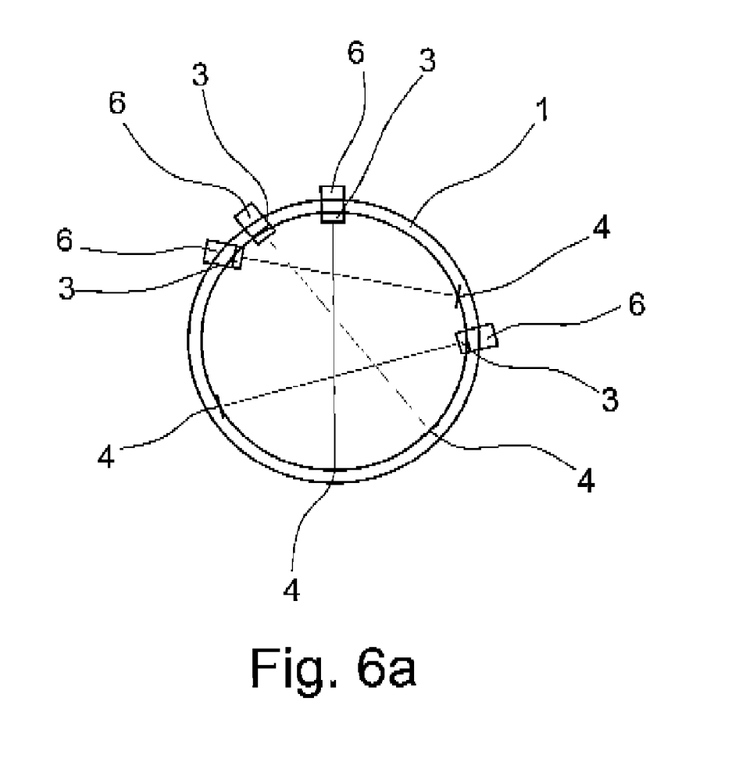
Figure 6B:
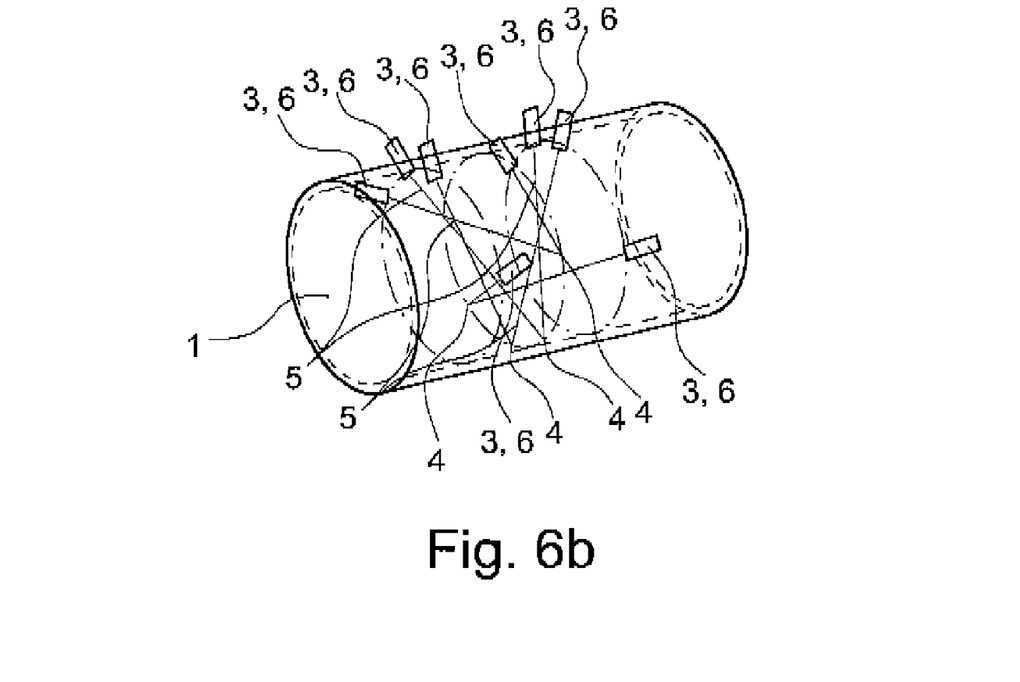

FIGS. 6a and 6b represent, respectively, a schematic cross-sectional and a perspective view of an ultrasonic flowmeter according to a sixth preferred embodiment of the invention. The ultrasonic flowmeter has a measuring tube 1 through which flows a medium, not depicted, and which, when viewed in cross section, has a bipartite split circumference forming two halves, and with two ultrasonic converter pairs, each with an associated ultrasound reflector 4, which ultrasonic converters 3 of each ultrasonic converter pair are mounted on a common circumferential half in a mutually offset position as viewed in the longitudinal direction of the measuring tube 1, while the ultrasound reflector 4 for each ultrasonic converter pair is positioned on the other, opposite, circumferential half in the longitudinal direction of the measuring tube 1 between the two ultrasonic converters 3, in such fashion that an ultrasound signal emitted by one ultrasonic converter 3 of an ultrasonic converter pair travels along a V-shaped signal path via the ultrasound reflector 4 of the associated ultrasonic converter pair to the other ultrasonic converter 3 of that ultrasonic converter pair, wherein a third ultrasound converter pair is provided together with an associated ultrasound reflector 4 to create a V-shaped signal path 5 which extends along a plane that intersects the other two planes within the measuring tube 1, wherein the other two planes do not intersect within the measuring tube 1 and wherein the measuring tube 1 is oriented in a way whereby the ultrasound converters 3 of all ultrasound converter pairs are positioned at a level higher than that of the associated ultrasound reflector 4. A fourth ultrasound converter pair is provided together with an associated ultrasound reflector 4 to create a V-shaped signal path 5 which extends along a plane that intersects the other two planes within the measuring tube 1 and the third and the fourth planes each extend at an angle other than 90° relative to the first plane and the second plane without extending parallel to each other.

What is claimed is:

1. An ultrasonic flowmeter with a measuring tube through which flows a medium and which, viewed in its cross section, has a bipartite split circumference forming two halves, and with two ultrasonic converter pairs, each with an associated ultrasound reflector, the ultrasonic converters of each ultrasonic-converter pair being mounted on a common circumferential half in a mutually offset position as viewed in the longitudinal direction of the measuring tube, while the ultrasound reflector for each ultrasonic converter pair is positioned on the other, opposite circumferential half in the longitudinal direction of the measuring tube between the two ultrasonic converters, in such fashion that an ultrasound signal emitted by one ultrasonic converter of an ultrasonic converter pair travels along a V-shaped signal path via the ultrasound reflector of the associated ultrasonic converter pair to the other ultrasonic converter of that ultrasonic converter pair, wherein the first ultrasound converter pair and the second ultrasound reflector are positioned on one circumferential half of the measuring tube while the second ultrasound converter pair and the first ultrasound reflector are positioned on the other circumferential half of the measuring tube, wherein the two V-shaped signal paths extend along different planes, the different planes do not intersect within the measuring tube and the measuring tube is oriented in a way whereby the ultrasound converters of all ultrasound converter pairs are positioned at a level higher than that of the associated ultrasound reflector.

2. The ultrasonic flowmeter as in claim 1, wherein said flowmeter comprises at least one additional ultrasound converter pair with an associated ultrasound reflector for creating an additional V-shaped signal path.

3. The ultrasonic flowmeter as in claim 1, wherein, viewed in the longitudinal direction of the measuring tube, two ultrasound reflectors are spaced apart by not more than the maximum distance between two ultrasound converters of an ultrasound converter pair.

4. The ultrasonic flowmeter as in claim 3, wherein, viewed in the longitudinal direction of the measuring tube, all ultrasound reflectors are mounted over the same length of the measuring tube.

5. An ultrasonic flowmeter with a measuring tube through which flows a medium and which, viewed in its cross section, has a bipartite split circumference forming two halves, and with two ultrasonic converter pairs, each with an associated ultrasound reflector, which ultrasonic converters of each ultrasonic converter pair are mounted on a common circumferential half in a mutually offset position as viewed in the longitudinal direction of the measuring tube, while the ultrasound reflector for each ultrasonic converter pair is positioned on the other, opposite circumferential half in the longitudinal direction of the measuring tube between the two ultrasonic converters, in such fashion that an ultrasound signal emitted by one ultrasonic converter of an ultrasonic converter pair travels along a V-shaped signal path via the ultrasound reflector of the associated ultrasonic converter pair to the other ultrasonic converter of that ultrasonic converter pair, wherein a third ultrasound converter pair is provided together with an associated ultrasound reflector to create a V-shaped signal path which extends along a plane that intersects the other two planes within the measuring tube, wherein the other two planes do not intersect within the measuring tube and wherein the measuring tube is oriented in a way whereby the ultrasound converters of all ultrasound converter pairs are positioned at a level higher than that of the associated ultrasound reflector.

6. The ultrasonic flowmeter as in claim 5, wherein the other two planes extend parallel to each other while the third plane extends in a direction perpendicular to the other two planes.

7. The ultrasonic flowmeter as in claim 6, wherein the flowmeter incorporates at least one more ultrasound converter pair with an associated ultrasound reflector for creating an additional V-shaped signal path which signal path extends along a plane parallel to the first two mutually parallel planes.

8. The ultrasonic flowmeter as in claim 5, wherein the third plane encompasses the longitudinal axis of the measuring tube.

9. The ultrasonic flowmeter as in claim 5, wherein a fourth ultrasound converter pair is provided together with an associated ultrasound reflector to create a V-shaped signal path which extends along a plane that intersects the other two planes within the measuring tube and the third and the fourth planes each extend at an angle other than 90° relative to the first plane and the second plane without extending parallel to each other.

10. The ultrasonic flowmeter as in claim 5, wherein the flowmeter comprises at least one further ultrasound converter pair with an associated ultrasound reflector for creating an additional V-shaped signal path which extends along a plane that does not intersect the plane of the first V-shaped signal path within the measuring tube, and the ultrasound converters of the additional ultrasound converter pair are positioned at a level higher than that of the associated ultrasound reflector.

11. The ultrasonic flowmeter as in claim 10, wherein the planes extend parallel to one another and that the ultrasound converter pairs are positioned on one circumferential half and the ultrasound reflectors are positioned on the other circumferential half of the measuring tube.

* * * * *